Oct. 6, 1925.
M. SIMON
1,555,953
ELECTRICAL HEATING UNIT AND METHOD OF MAKING SAME
Filed April 25, 1921
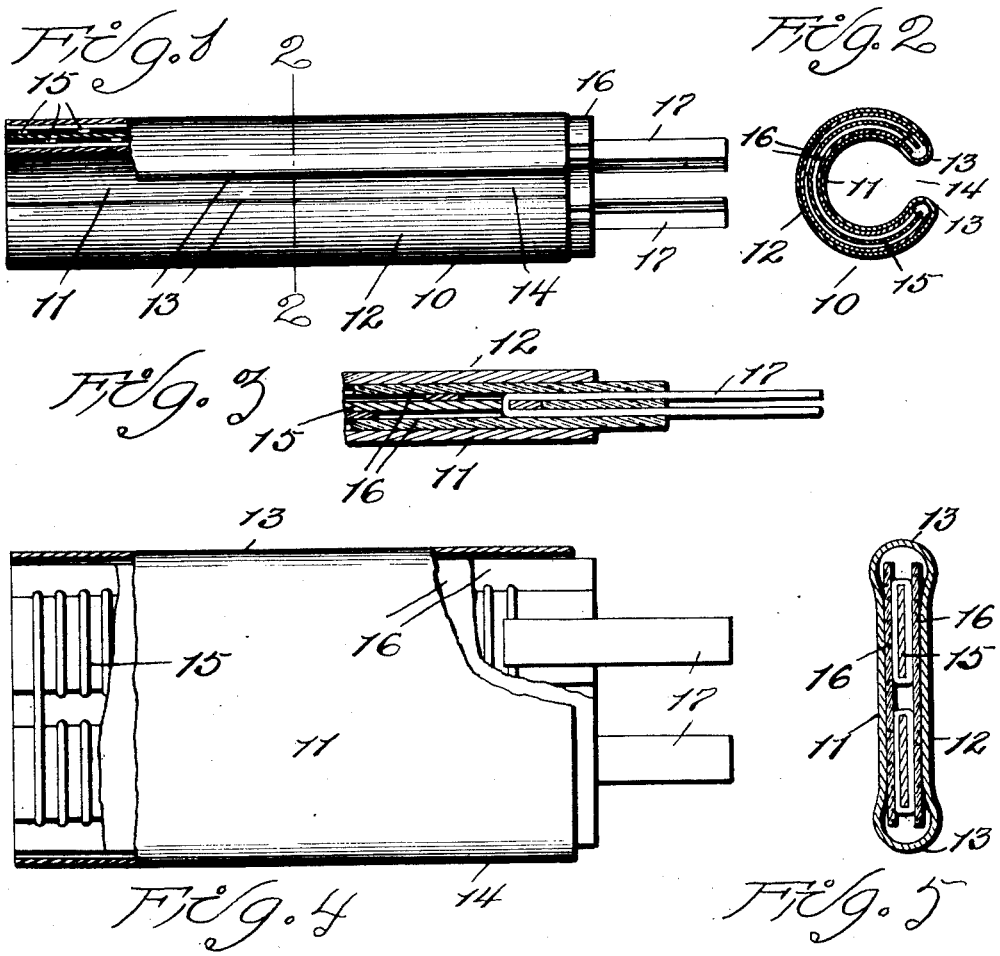
MAURICE SIMON
INVENTOR
by Roy M. Eilers
ATTORNEY Patented Oct. 6, 1925.

1,555,953

UNITED STATES PATENT OFFICE.

MAURICE SIMON, OF ST. LOUIS, MISSOURI.

ELECTRICAL HEATING UNIT AND METHOD OF MAKING SAME.

Application filed April 25, 1921. Serial No. 464,201.

*To all whom it may concern:*

Be it known that I, MAURICE SIMON, a citizen of the United States, residing in the city of St. Louis, in the State of Missouri, have invented a certain new and useful Electrical Heating Unit and Method of Making Same, of which the following is a clear, full, and exact description, such as will enable others skilled in the art to make and use the same.

My invention consists in the construction and arrangement of parts hereinafter described and particularly pointed out in the claims. In describing the various arrangements employed and shown in the drawings hereto attached and described in the specification, I do not limit my invention to the precise form or construction of apparatus shown, or the several parts thereto, inasmuch as various alterations may be made without changing the scope of my invention.

The object of my invention is to provide a compact, easily assembled and economically constructed electrical heating unit having sufficient resiliency to make effective thermal contact when the heating unit is inserted within or placed around an object to be heated. This application, among other things, relates to the making of a circular or cylindrical heating unit whose casing preferably has a compensating contour or excess portion to permit forming same into cylindrical shape. This application shows a heating unit whose casing makes effective contact with a body to be heated. At the time this application was filed I filed application Serial No. 464,202, which relates to electrical heating units controlled by springs, and Serial No. 464,203, relating to heating units controlled by manual means.

In the drawings, Fig. 1 is a view showing a resistance unit embodying my invention; a portion of the view being broken to show longitudinally extending resistance wire and insulation therefor. Fig. 2 is a cross sectional view of the heating unit shown in Fig. 1. Fig. 3 is a longitudinal section showing a preferred arrangement of terminals. Fig. 4 shows a similar resistance unit having portions broken out to illustrate a transverse section and also an arrangement of the terminals. Fig. 5 is a cross section showing a resistance element in the tube that has been flattened out. Fig. 6 shows my invention applied to resistance unit of tapered form. Fig. 7 is a cross section showing the enclosed casing made from a sheet instead of a tube.

In the drawings 10 is a casing preferably made of a heat conducting material, such as copper. 11 and 12 are walls; 11 being the inside wall and 12 being the outside wall. 13 is a closed end of the heating unit and 14 is an open seam between the closed ends. 15 is an electrical heating element of any suitable form or material, about which is placed insulation 16. 17 are terminals, 18 is a casing of tapered form shown in Fig. 6. 19 is a non-continuous casing having a sealing flap 20. In the preferred form of my invention as shown, I use for a casing a heat conducting tube preferably of copper. This casing is preferably of a metal which is hard enough to stand repeated insertions in and removals from the article to be heated without excessive wear on the casing. I prefer to make this casing of a seamless tube of copper rather than from a tube having a seam. By using a seamless tube the heat received at the various parts of the casing is conducted evenly with a minimum of loss to the object to be heated. However, I do not limit myself to the use of a seamless tube for casings. As shown in Fig. 5, the tube has been flattened out and the electrical resistor properly insulated has been positioned within the flattened tube. I thereupon form the flattened tube into an open seam cylinder and in so doing I compress the walls of the casing against the insulated resistor within. The ends 13 are preferably left with a diameter greater than the distance between the flattened walls 11 and 12. By having these enlarged ends the flattened tube may be formed into a member of circular or prismatic cross section, without the metal in the outside wall 17 being broken or unduly stretched.

My method of making these units is preferably to flatten a tube of high heat conducting material and when the tube has been sufficiently flattened to insert an insulated resistor therein and thereafter form the flattened tube upon a mandrel or other suitable machine, into an open seam cylinder, of desired cross section. It is obvious, however, I may form the tube into an open seam cylinder and then insert the insulated resistor and thereafter compress the walls of the cylinder so as to hold the insulated resistor under compression.

It is desirable that the walls of the casing shall subject the insulation to pressure. It is likewise desirable that the casing walls shall be as close as is safely permissible to the resistor because thereby the heat from the resistor is the more readily conducted to the casing. By the use of the continuous casing of good heat conducting material the heat generated by the unit is conducted to the object to be heated. If this heating unit be inserted within an aperture the heat received by the inside wall 11 is conducted around to the outside wall and when the resistance unit is placed about an object to be heated the heat delivered to the outside wall, in turn, is conducted around to the inside wall. The open seam cylindrical arrangement permits the operator to press the closed ends together in inserting the unit into an aperture, and when the unit is placed around an object to be heated the closed ends will be moved outwardly, and the resiliency of the casing will in each instance cause the casing to make a close thermal-contact with the material to be heated. It is obvious that I may use a flat sheet of metal and fold it over to form a closed casing, preferably soldering or brazing the edges of the metal as shown in Fig. 7. While I have shown the flap at one of the ends of the unit it is preferable to place the flap at a point intermediate the ends, either inside or outside and to thus make the casing a practically continuous heat conductor. To maintain the resiliency of the open seam cylinder it is desirable to solder or braze the edges of the metal. I do not restrict my invention to a cylindrical construction of heating unit because my invention may be applied to heating units of various forms. Inasmuch as a high temperature is obtained with these heating units, I prefer to use a resilient element or spring made of a material whose resiliency will not be impaired or destroyed when subjected to repeated high temperatures.

I claim:

1. The hereinbefore described method of making electrical heating units which consists in placing within a continuous heat conducting element a suitably insulated electrical heating resistor and thereafter forming such member into a resilient open seam member.

2. The hereinbefore described method of making electrical heating units which consists in forming a continuous heat conducting element into an open seamed member and thereafter compressing a suitably insulated electrical resistor therein.

3. An electrical heating unit comprising an electrical resistor, and a casing of flexible, heat conducting material having the form of a double walled open seam cylinder.

4. An electrical heating unit comprising an electrical resistor and a casing of flexible, heat conducting material having the form of a double walled open seam cylinder pressed about the resistor.

5. In a resistance unit, the combination of a metallic casing so arranged that in folding the resistance unit an excess portion of the casing will compensate for the difference between the longer and shorter faces of the unit and a resistor compressed within and adjacent the walls of the casing to permit the heat of the resistor to be readily conducted to the casing.

6. In a resistance unit, the combination of a casing having its transverse edges so arranged as to permit of a certain limited compensating movement between its inner and outer walls in flexing the unit into tubular form with a longitudinal open seam, and a resistor compressed between and adjacent the walls of the casing to permit the heat of the resistor to be readily conducted to the casing.

7. The combination of a resilient continuous, double walled open seam member of heat conducting material and an electrical resistor within the walls of the member.

8. A resilient heating unit of tubular form with a longitudinal open seam, a resistor, a casing member on one side of the resistor, a casing member on the other side of the resistor, the transverse edges of said members being adapted to permit a certain limited movement relative to each other, means for holding the longitudinal edges of said members in fixed relation to each other.

9. In a resistance unit, the combination of a casing having an excess contour portion affording material to be taken up in flexing the casing into tubular form and a resistor compressed within and closely adjacent the walls thereof to permit the heat of the resistor to be readily conducted to the casing.

MAURICE SIMON.